No. 674,658. Patented May 21, 1901.
R. H. STEELE.
HARROW ATTACHMENT FOR PLOWS.
(Application filed Mar. 11, 1901.)
(No Model.)
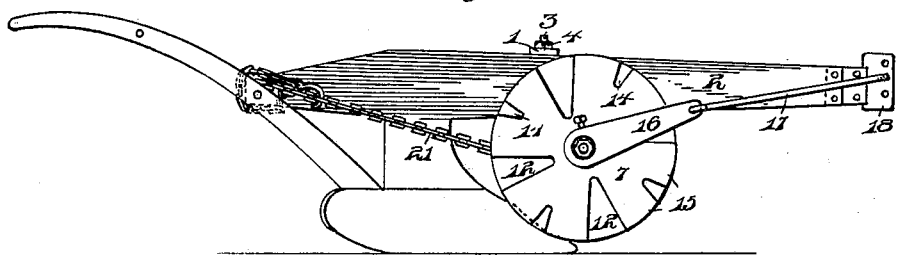
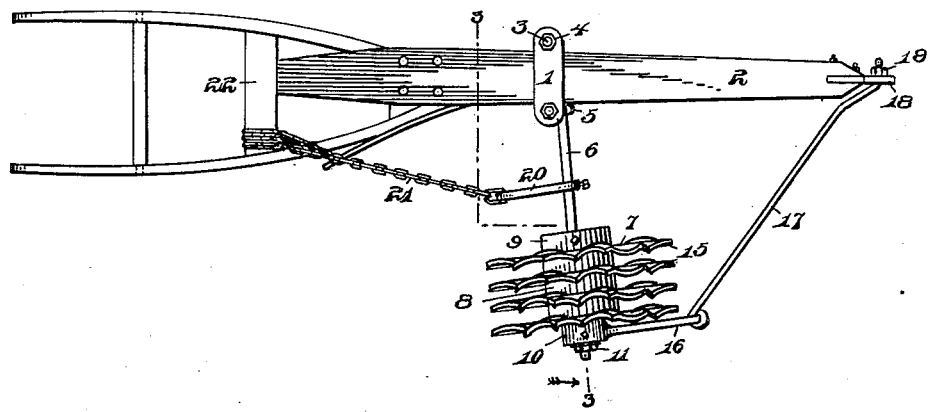
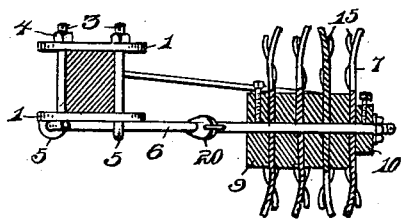
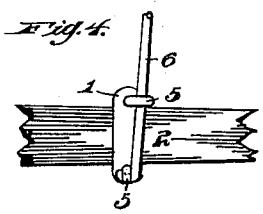
Witnesses:
Inventor
R. H. Steele.
By
Atty's.

UNITED STATES PATENT OFFICE.

REUBEN H. STEELE, OF SEWICKLEY, PENNSYLVANIA.

HARROW ATTACHMENT FOR PLOWS.

SPECIFICATION forming part of Letters Patent No. 674,658, dated May 21, 1901.

Application filed March 11, 1901. Serial No. 50,586. (No model.)

*To all whom it may concern:*

Be it known that I, REUBEN H. STEELE, a citizen of the United States of America, residing at Sewickley, in the county of Allegheny and State of Pennsylvania, have invented certain new and useful Improvements in Harrow Attachments for Plows, of which the following is a specification, reference being had therein to the accompanying drawings.

This invention relates to certain new and useful improvements in combined plows and harrows, and has for its object to provide an attachment for plows, whereby the ground as plowed may be pulverized or harrowed ready for the planting or sowing of the seed.

Briefly described, the invention comprises an attachment which is adapted to be connected to the plow and which harrows or pulverizes one furrow at a time, the attachment being so connected to the plow that the ground turned over by the plow during one passage is harrowed or pulverized during the next passage of the plow.

The attachment consists of a series of rotatable disks which are preferably toothed and which are mounted on a shaft or rod supported from the plow-beam. This shaft is adjustably supported, so that any angle of the same with respect to the plow-beam may be obtained in order to have the cutting-disks in line with the furrow or at an angle thereto, as may be found most desirable, according to the condition of the soil.

The attachment is supported from the plow-beam in a manner that it may be adjusted for either right or left hand plows and is suitably braced both from the front and from the rear end of the plow-beam, all of which construction, together with other details entering into my invention, will be hereinafter more specifically described and then particularly pointed out in the claims, and in describing the invention in detail reference will be had to the accompanying drawings, forming a part of this specification, and wherein like numerals of reference will be employed for indicating like parts throughout the several views of the drawings, in which—

Figure 1 is a side elevation of a plow with my attachment secured in position thereon. Fig. 2 is a top plan view of the same. Fig. 3 is a transverse vertical sectional view taken on the line 3 3 of Fig. 2. Fig. 4 is an underneath plan view of a part of the beam and the rod or shaft which supports the disks. Fig. 5 is an edge view of one of the disks detached from the rod or shaft.

To put my invention into practice, I provide a pair of clamping-plates 1, which engage the plow-beam 2, one on the upper face thereof and the other on the lower face. These clamping-plates are bound to the beam 2 by means of a pair of bolts 3, passing through the plates near the ends thereof. The bolts are threaded on their upper ends to receive securing-nuts 4 and on their lower ends are turned over to form hooks 5, which receive and hold the supporting rod or shaft 6, on which the cutting-disks are mounted. The inner end of this rod or shaft is preferably bent over, so as to form a catch with the bolt 3, as shown, the part of the rod or shaft 6 that is under the lower clamping-plate 1 being bound firmly against this plate by the hook ends 5 of the bolts 3 when the nuts of the latter are tightened. This rod or shaft 6 extends outwardly to one side of the plow-beam for some distance and has mounted thereon a series of cutting or pulverizing disks 7, which are spaced apart by washers 8, mounted on the rod 6 between the disks, and they are held in place by two outside washers 9 10, which are rigidly secured to the rod or shaft 6 by set-screws, as shown. The rod or shaft 6 is threaded at its outer end to receive a nut 11, and it will be observed that when the set-screws which secure the washers 9 10 to the rod or shaft 6 are loosened the disks may be moved upon the rod closer to the plow-beam or farther away, as desired. The disks may also be spaced farther apart or closer together by varying the size of the washers 8, as will be readily apparent. Each disk is provided with peripheral notches 12 14, alternating with each other, the notches 12 being of considerably greater depth than the notches 14. The material between the notches is bent outwardly alternately in opposite directions, forming blades 15, which serve to more thoroughly pulverize the soil. I have found that to extend all the notches into the disk the distance shown for the notches 12 it weakens the disk; but by alternating these notches in the manner herein shown I am enabled to form the cutting-blades and still preserve the strength of the disk, the deep notches permitting the disk to more readily enter the soil than is the case where the disk is merely slit peripherally and the material struck outward to each side thereof.

The washer 10 carries a link or arm 16, formed integral with said washer and to the free end of which is connected the one end of a brace-rod 17, the other end of which is threaded and passed through one of the apertures in the clevis-plate 18, carried in the front of the plow-beam, where it is held by a nut 19 or equivalent fastening means. Mounted on the rod or shaft 6, between the washer 9 and the plow-beam 2, is a link 20, to which is connected a chain 21, which may be wrapped around the brace 22, into which the rear end of the plow-beam is mortised.

It will be observed that as one furrow is turned over the preceding one will be under the harrow or pulverizer and that the last furrow may be harrowed by simply making one more round with the plow, under which conditions the shaft could be loosened and the harrow attachment or disks moved closer to the plow-beam. While herein shown on a right-hand plow, it will be evident that the device can be readily reversed, so as to be applicable to a left-hand plow as well, and in the practice of the invention it will be observed that various changes could be made without departing from the general spirit of the invention.

Having fully described my invention, what I claim as new, and desire to secure by Letters Patent, is—

1. In a device of the character described, a beam, a shaft secured at an angle thereto, an arm connected to said shaft, a chain connected to said arm and to the plow, a series of circular cutting-disks provided with V-shaped notches mounted on said shaft, washers interposed between said disks, a washer rigidly secured to said shaft, a second washer rigidly secured thereon, an arm made integral with said second washer, and a rod connected to said arm and to the plow-beam, substantially as described.

2. In a device of the character described, a beam, a shaft secured at an angle thereto, an arm rigidly mounted on said shaft, a chain connected to said arm and to the plow, a series of circular cutting-disks mounted on said shaft, said disks having V-shaped notches formed on its periphery, the portions between said apertures being oppositely alternately outwardly bent, washers interposed between said disks, a washer rigidly secured to said shaft, a second washer rigidly secured to said shaft, an arm made integral therewith and a rod connecting said arm and the said beam, substantially as described.

3. In a device of the character described, a beam, a pair of clamping-plates arranged on the opposite sides thereof, a pair of threaded bolts having their free ends bent to form hooks secured to said plates, a shaft, a hook on one end thereof, said shaft passing through one of said hooks of the bolts, the hook of said shaft engaging the other hook of the other bolt, an arm secured to said shaft, a chain secured to said arm and to the plow, a series of cutting-disks mounted on said shaft, said disks having V-shaped notches alternately of greater and less depth formed therein, the portions between said notches being alternately oppositely outwardly bent, washers interposed between said disks, a washer rigidly secured to said shaft to prevent lateral movement of the disks a second washer rigidly secured to said shaft, an arm made integral with said second washer, and a rod connected to said arm and to the beam, substantially as described.

In testimony whereof I affix my signature in the presence of two witnesses.

REUBEN H. STEELE.

Witnesses:
JOHN NOLAND,
A. N. WILSON.